United States Patent [19]
Rawson

[11] Patent Number: 5,303,925
[45] Date of Patent: Apr. 19, 1994

[54] GOLF SWING GAUGE

[76] Inventor: Robert E. Rawson, 9521 Harriet La., Anaheim, Calif. 92804

[21] Appl. No.: 997,555

[22] Filed: Dec. 28, 1992

[51] Int. Cl.$^5$ ............................................. A63B 69/36
[52] U.S. Cl. ................................ 273/186.2; 273/194 R
[58] Field of Search ............... 273/186.2, 186.3, 187.4, 273/187.5, 194 R, 194 A, 194 B

[56] References Cited

U.S. PATENT DOCUMENTS

| | | | |
|---|---|---|---|
| 3,136,553 | 6/1964 | Davis | 273/194 R X |
| 3,561,272 | 2/1971 | Davis | 273/194 R X |
| 3,848,873 | 11/1974 | Linning | 273/186.2 |
| 4,969,921 | 11/1990 | Silvera | 273/186.2 |

Primary Examiner—George J. Marlo
Attorney, Agent, or Firm—Edgar W. Averill, Jr.

[57] ABSTRACT

A golf swing gauge attached to the shaft of the golf club adjacent the handle of the club. The swing gauge measures the centrifugal force at the gauge during a practice swing. The gauge is equipped with a needle from which the reading may be ascertained after which the needle is reset by pushing a button on the exterior of the gauge. Several weights may be added or removed from the operating shaft of the gauge to accommodate different swings.

10 Claims, 2 Drawing Sheets

1

GOLF SWING GAUGE

BACKGROUND OF THE INVENTION

The field of the invention is sporting goods and the invention relates more particularly to golf accessories.

Numerous devices are used by golfers to improve their swing. Several centrifugal force measuring devices have been attached to or incorporated in golf clubs and such devices are shown in the following U.S. Pat. Nos. 1,471,794; 2,135,648; 2,223,647; 2,986,937; 3,561,272; 3,677,553; 4,168,068; and 4,363,488. Some of the devices shown in the above listed patents are incorporated into the golf club itself which would of course, change the swing weight of the golf club and make it impractical for play. Other devices are attached to the club near the club head and this again, greatly changes the swing weight. Most of the devices of the above patents have pointers and indicia which are difficult to read, expensive to fabricate or difficult to reset. Also, the devices are not adjustable for different players and different clubs.

SUMMARY OF THE INVENTION

It is an object of the present invention to provide a golf swing gauge which is easily read, easily reset, and provided with a plurality of weights which may be added or subtracted to compensate for the player and the club selected.

The present invention is for a golf swing gauge attached to the shaft of a golf club, adjacent the handle of the golf club. The gauge has a generally cylindrical hollow support shaft which holds an upwardly biased weight supporting shaft. A plurality of weights may be added or removed from the weight supporting shaft and gauge means are provided for reading the downward axial deflection of the weight supporting shaft during a practice swing. Means are also provided for resetting the gauge after a swing. Preferably the gauge has a needle and a face plate with indicia which facilitates the reading of the result. Also, preferably the gauge has an external button which easily permits resetting the gauge.

DESCRIPTION OF THE PREFERRED EMBODIMENTS

Figure 1:
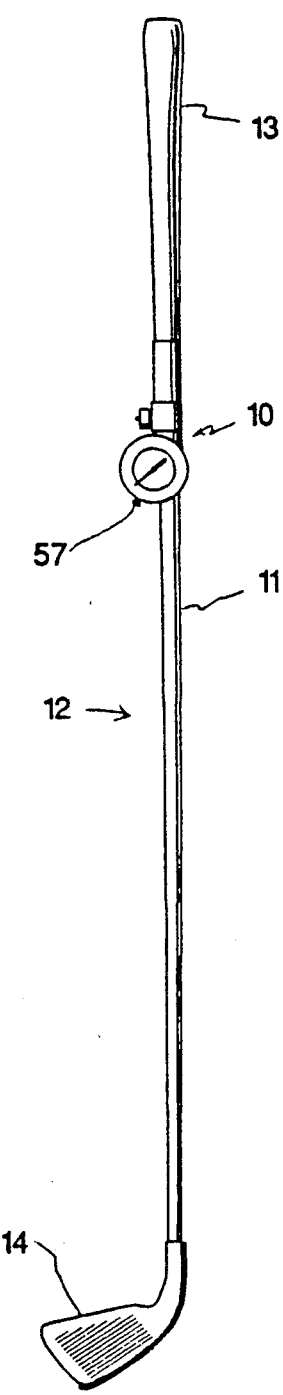
FIG. 1 is a front view of a golf club with the golf swing gauge of the present invention attached thereto.

The golf swing gauge of the present invention is shown in FIG. 1 and indicated generally by reference character 10. Golf swing gauge 10 is clamped to a shaft 11 of a golf club 12. Golf club 12 has a handle 13 and a club head 14. The golf swing gauge 10 is affixed by a clamp to shaft 11 adjacent the bottom of handle 13.

By attaching golf swing gauge 10 adjacent handle 13, the swing weight of the club is only minimally changed. First of all, the golf swing gauge 10 is very light in weight. Secondly, it is at a position far removed from club head 14 so that the swing weight is essentially unaffected. The amount of centrifugal force present just below handle 13 translates into club head velocity. Therefore, the reading of gauge 10 is a measure of the velocity of club head 14 during a swing. Gauge 10 is intended to be used only during practice swings as the vibration caused by impact of club head 14 with a golf ball will distort the reading. The gauge can be used indoors for practice and provides a reading which greatly increases the enjoyment of the practice as well as helping the golfer to obtain a consistent reading, thus, improving muscle memory and increasing confidence that the ball will be well struck during play. The gauge can also be used to assist the golfer in selecting new clubs to match his or her swing rather than adjusting the swing to fit the new club. Since the gauge essentially measures the maximum hand speed, for any given golf swing, the reading on the dial will be the same for clubs with the same swing weight. The gauge may be easily attached and removed from shaft 11.

Figure 2:
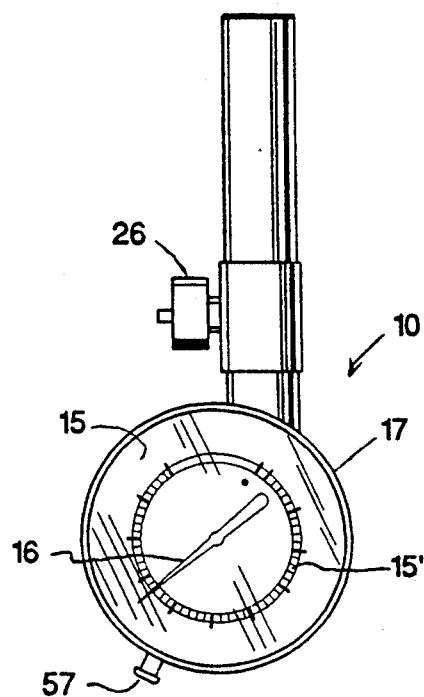
FIG. 2 is a front view of the golf swing gauge of FIG. 1.
Figure 3:
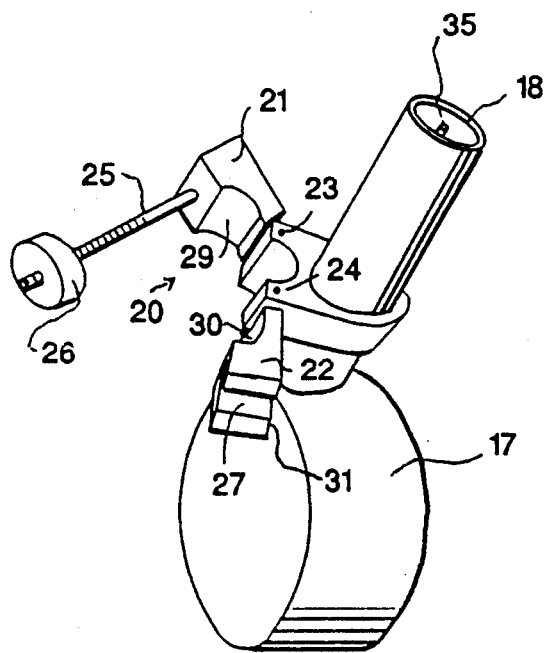
FIG. 3 is a perspective view showing the rear, side, and clamp means of the golf swing gauge of FIG. 2.

Turning now to the details of construction of the gauge, a front view of the gauge is shown in FIG. 2 where it can be seen that the gauge has a gauge face 15 which includes indicia 15' to which the gauge needle 16 points after a swing. The gauge has a generally cylindrical hollow body 17 which is held to a generally cylindrical hollow support shaft 18. A collar 19 holds a clamp 20 shown best in FIG. 3.

Clamp 20 has a first and second opposed shell portion 21 and 22 respectively. Shells 21 and 22 are held to collar 19 by shell hinge pins 23 and 24. A threaded clamp shaft 25 is held to shell 21 and holds a clamp nut (preferably knurled) 26. Clamp shaft 25 fits in a groove 27 in shell 22 which is also hingedly affixed to collar 19 by pin 24. Collar 19 includes a semi-cylindrical groove 28. Shell 21 includes a semi-cylindrical groove 29 and shell 22 includes a semi-cylindrical groove 30 which of course, surround the shaft and permit the clamp nut 26 to tighten against the nut adjusting surface 31 of shell 22 to tighten and hold the gauge around the shaft. Of course, the particular clamp design is not an essential portion of the present invention.

Figure 4:
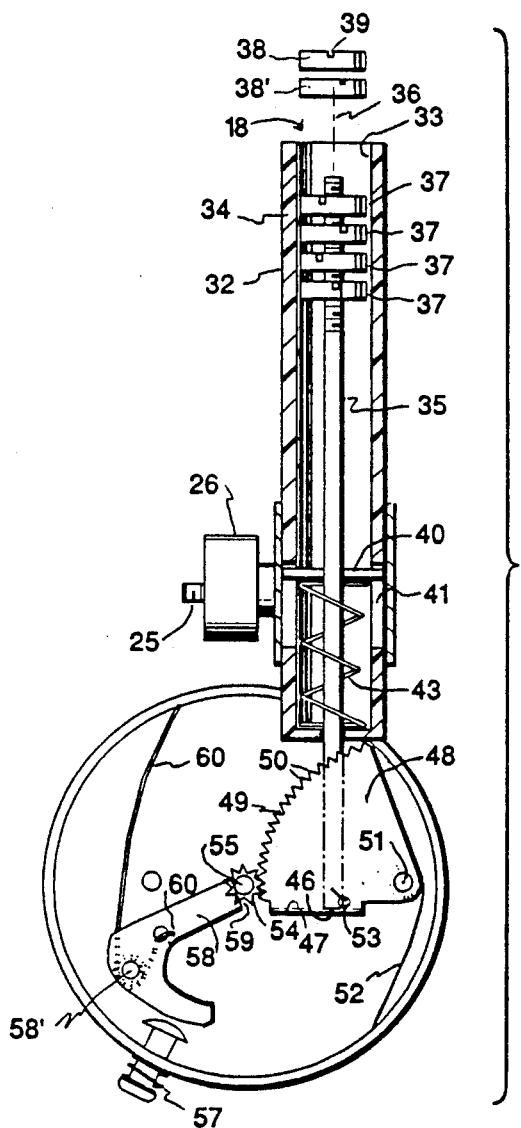
FIG. 4 is a cross-sectional front view of the golf swing gauge of FIG. 2.

Turning now to the internal construction of the swing gauge, the gauge is shown in cross-sectional view in FIG. 4 where it can be seen that generally cylindrical hollow support shaft 18 has an outer surface 32, an inner surface 33 and a side wall 34. An upwardly biased weight supporting shaft 35 is threaded near its upper end and holds a plurality of weights 37. Two additional weights are shown above the gauge in FIG. 4 and indicated by reference characters 38 and 38' respectively. Preferably the weights include a slot 39 into which a weight adding and removal tool (not shown) may be fitted for facilitating the adding or subtracting of weights. The ability to add or subtract weights is an important feature of the present invention, and helps customize the gauge for the particular golfer who is using it as well as for the particular club upon which the golfer is using it.

Weight supporting shaft 35 has a guide pin 40 held in a hole which passes through the shaft. Guide pin 40 extends outwardly from the shaft and fits into a pair of slots 41 and 42 in the side wall 34 of hollow support shaft 18. These slots together with pin 40 limit the upward and downward movement of shaft 35. A shaft spring 43 abuts the guide pin 40 at its upper end in a spring support disk 44 at the bottom. Spring support disk 44 has a central opening 45 which also guides the weight supporting shaft 35. The bottom 46 of weight supporting shaft 35 contacts a support ledge 47 which extends away from gauge face 15 and is part of a gear plate 48. Gear plate 48 has an arcuate gear face 49 with teeth 50. It is pivoted at pivot point 51 which also holds the coils of a return spring 52. Return spring 52 returns gear plate 48 during resetting as indicated below.

Gear teeth 50 of gear plate 48 mesh with a needle shaft drive gear 54 on a gauge needle shaft 55. Gauge needle shaft 55 extends through gauge face 15 and supports gauge needle 16 in a conventional manner. Gauge needle shaft 55 is, of course, also supported in the base 56 of the gauge body.

Figure 5:
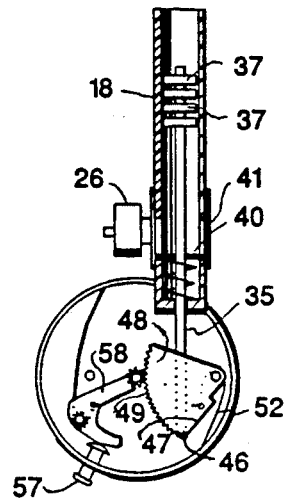
FIG. 5 is a cross-sectional view analogous to FIG. 4 except showing the weight supporting shaft in a downwardly deflected position.
Figure 6:
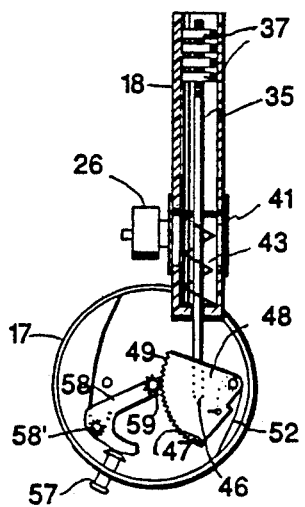
FIG. 6 shows the golf swing gauge of FIG. 5 with the weight supporting shaft in a retracted position prior to resetting of the gauge.

During a swing, the weight supporting shaft depresses shaft spring 43 as shown in FIG. 5 and moves gear plate 48 downwardly. This, of course, turns gauge needle shaft 55 moving gauge needle 16 to a reading such as that shown in FIG. 2. After the swing, the weight support shaft, of course, moves upwardly as shown in FIG. 6 but the gear plate 48 remains in a deflected position as does gauge needle 16 to permit the golfer to note the reading. After the reading is noted, a reset button 57 is depressed. This moves a biased brake plate 58 away from needle shaft 55 causing return spring 52 to move gear plate 48 back to the position shown in FIG. 4 and, of course, resets needle 16 to its zero position.

Biased gear plate 58 has a brake face 59 which contacts the outer surface of gauge needle shaft 55. While it permits the needle shaft 55 to turn during a swing, it is held against the shaft 55 with sufficient force to prevent return spring 52 from moving gear plate 48 back to is original position. This is accomplished by the force of a brake plate spring 60 which urges biased brake plate 58 in a position so that brake face 59 pushes against the shaft 55. However, when reset button 57 is pushed, brake face 59 is pivoted about 58' and is thus moved away from the outer surface of needle shaft 55 permitting return spring 52 to move gear plate 48 back to the position shown in FIG. 54 resetting gauge needle 16.

The gauge of the present invention can be constructed so that it is very light weight and yet is durable, easily read, and easily reset. While the construction of the reading and resetting portion of the swing gauge of the present invention is preferred, the essential features include the ability to add or subtract weights and the point of attachment to the golf club.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A golf swing gauge attached to the shaft of a golf club, said golf club having a shaft, a handle and a club head, said gauge being attached below the handle, said gauge comprising:
 a generally cylindrical, hollow support shaft having an outer surface, an inner surface, a central, longitudinal axis, and a side wall;
 an upwardly-biased weight supporting shaft supported within said generally cylindrical, hollow support shaft said weight supporting shaft being supported along the central, longitudinal axis of said support shaft;
 a plurality of weights, at least one of which is affixed to said weight supporting shaft;
 gauge means for reading the downward axial deflection of said upwardly biased weight supporting shaft during a swing; and
 means for resetting the gauge means in preparation for the next swing.

2. The golf swing gauge of claim 1 wherein said gauge means for reading the downward axial deflection of said upwardly biased weight supporting shaft during a swing comprises:
 a gear plate having an arcuate gear face including gear teeth, said gear plate including a support ledge contacted by said weight supporting shaft, said gear plate being pivoted at the center of said arcuate gear face and being biased so that it moves to a stop against the weight supporting shaft;
 a gauge needle supported on a needle shaft, said needle shaft including a needle gear with teeth which mesh with said arcuate gear shaft; and
 means for holding said gauge needle in a deflected position.

3. The golf swing gauge of claim 2 wherein said means for holding said gauge needle in a deflected posi7 tion comprises a biased brake plate having a brake face contacting the needle shaft of said gauge needle, which biased brake face has operative means for moving the brake face away from the needle shaft of said gauge needle.

4. The golf swing gauge of claim 1 wherein said plurality of weights are held on said weight supporting shaft by being threaded on said shaft, said weights being disk shaped and including an axially directed threaded opening which mates with threads on the weight supporting shaft.

5. The golf swing gauge of claim 4 wherein there are at least four weights.

6. The golf swing gauge of claim 1 wherein said weight supporting shaft is captured in said hollow support shaft by a guide pin held in a hole through said weight supporting shaft so that the guide pin extends outwardly from both sides of the shaft and the hollow support shaft includes a pair of slots in the side wall of the hollow support shaft which slots capture said guide pin and limit the upward and downward movement of said weight supporting shaft.

7. A golf swing gauge attached to the shaft of a golf club, said golf club having a shaft, a handle and a club head, said gauge being attached below the handle, said gauge comprising:
 a generally cylindrical, hollow support shaft having an outer surface, an inner surface, a central, longi7 tudinal axis, and a side wall;
 an upwardly-biased weight supporting shaft supported within said generally cylindrical, hollow support shaft said weight supporting shaft being supported along the central, longitudinal axis of said support shaft;
 a plurality of weights, at least one of which is affixed to said weight supporting shaft;

gauge means for reading the downward axial deflection of said upwardly biased weight supporting shaft during a swing, said gage means having a generally cylindrical hollow body with a biased, arcuate gear, including gear teeth on the arcuate portion thereof, said arcuate gear being supported within said cylindrical hollow body and said gauge means including a gauge face with indicia and a gauge needle supported above said gauge face and said needle being supported by a needle shaft extending below said gage face and said needle shaft having a needle gear which meshes with the gear teeth of said arcuate gear and said needle shaft contacting brake means for holding said needle in a maximum deflected position; and means for resetting the gauge means in preparation for the next swing.

8. The golf swing gauge of claim 7 wherein said gauge is affixed by a clamp to the shaft of the golf club just below the handle of the golf club.

9. The golf swing gauge of claim 8 wherein said clamp is affixed to the outer surface of said generally cylindrical hollow support shaft.

10. The golf swing gauge of claim 9 wherein said clamp includes first and second opposed shells, the first of which holds a threaded clamp shaft including a clamp nut and the second of which has a groove into which the threaded clamp shaft fits and the second of which also includes a nut abutting surface whereby when the opposed shells are placed around the shaft of the golf club adjacent the handle thereof, the opposed shells may be tightened against the shaft thereby holding the gauge in place.

* * * * *